(12) United States Patent
Fujihara et al.

(10) Patent No.: US 9,079,771 B2
(45) Date of Patent: Jul. 14, 2015

(54) HYDROGEN GENERATION SYSTEM, FUEL CELL SYSTEM, AND METHOD FOR OPERATION OF HYDROGEN GENERATION SYSTEM

(75) Inventors: Seiji Fujihara, Osaka (JP); Yukimune Kani, Osaka (JP); Hidenobu Wakita, Kyoto (JP); Kensaku Kinugawa, Nara (JP)

(73) Assignee: PANASONIC CORPORATION, Osaka (JP)

( * ) Notice: Subject to any disclaimer, the term of this patent is extended or adjusted under 35 U.S.C. 154(b) by 1141 days.

(21) Appl. No.: 12/669,443
(22) PCT Filed: Jul. 4, 2008
(86) PCT No.: PCT/JP2008/001800
§ 371 (c)(1),
(2), (4) Date: Jan. 15, 2010
(87) PCT Pub. No.: WO2009/011098
PCT Pub. Date: Jan. 22, 2009

(65) Prior Publication Data
US 2010/0183928 A1    Jul. 22, 2010

(30) Foreign Application Priority Data
Jul. 18, 2007   (JP) ................. 2007-187250

(51) Int. Cl.
*H01M 8/04* (2006.01)
*H01M 8/06* (2006.01)
(Continued)

(52) U.S. Cl.
CPC . *C01B 3/384* (2013.01); *C01B 3/48* (2013.01); *H01M 8/0618* (2013.01);
(Continued)

(58) Field of Classification Search
CPC ............... C01B 3/22–3/44; C01B 2203/0283; C01B 2203/1235; C01B 2203/1241; C01B 2203/1247; C01B 2203/1614; C01B 2203/1619; C01B 2203/1623; C01B 2203/169; C01B 3/386; C01B 3/48; H01M 8/04223; H01M 8/04231; H01M 8/04373; H01M 8/04776; H01M 8/0618; H01M 8/0668
USPC .......... 429/416, 420, 423–425, 429; 422/110, 422/111
See application file for complete search history.

(56) References Cited

U.S. PATENT DOCUMENTS

2010/0040915 A1 *   2/2010   Wakita et al. .................. 429/17

FOREIGN PATENT DOCUMENTS

| | | |
|---|---|---|
| EP | 1538126 A1 | 6/2005 |
| JP | 2000-095504 | 4/2000 |

(Continued)

OTHER PUBLICATIONS

Machine tranlsaion of Fujiwara et al., JP 2004-307236 A.*

(Continued)

*Primary Examiner* — Edu E Enin-Okut
(74) *Attorney, Agent, or Firm* — McDermott Will & Emery LLP

(57) ABSTRACT

A hydrogen generating apparatus is provided that further suppresses deterioration in capability of a converting catalyst in raw material purge in a shutdown operation.
The hydrogen generating apparatus contains a raw material supplying device 101 that supplies a raw material; a reforming device 111 that contains a reformation catalyst and generates a hydrogen-containing gas from the raw material through reformation reaction with the reformation catalyst; a modifying device 121 that contains a modification catalyst and decreases carbon monoxide in the hydrogen-containing gas through shift reaction with the modification catalyst; a first temperature detector 123 that detects a temperature of the modification catalyst; and a controlling device 200, and the controlling device 200 controls the raw material supplying device 101 to purge an interior of the converting device 121 with the raw material when a detected temperature of the first temperature detector 123 becomes a first threshold value, at which deterioration of the modification catalyst with the raw material is suppressed, or lower in a shutdown operation.

6 Claims, 7 Drawing Sheets

(51) Int. Cl.
 *C01B 3/38* (2006.01)
 *C01B 3/48* (2006.01)

(52) U.S. Cl.
 CPC .... *H01M 8/0631* (2013.01); *C01B 2203/0233* (2013.01); *C01B 2203/0283* (2013.01); *C01B 2203/044* (2013.01); *C01B 2203/047* (2013.01); *C01B 2203/066* (2013.01); *C01B 2203/0811* (2013.01); *C01B 2203/0822* (2013.01); *C01B 2203/0827* (2013.01); *C01B 2203/0883* (2013.01); *C01B 2203/107* (2013.01); *C01B 2203/1058* (2013.01); *C01B 2203/1064* (2013.01); *C01B 2203/1223* (2013.01); *C01B 2203/1241* (2013.01); *C01B 2203/1247* (2013.01); *C01B 2203/146* (2013.01); *C01B 2203/1609* (2013.01); *C01B 2203/1614* (2013.01); *C01B 2203/1619* (2013.01); *Y02E 60/50* (2013.01)

(56) References Cited

FOREIGN PATENT DOCUMENTS

| | | | | |
|---|---|---|---|---|
| JP | 2002-151124 | 5/2002 | | |
| JP | 2002-356307 | 12/2002 | | |
| JP | 2003-261302 | 9/2003 | | |
| JP | 2004-307236 | 11/2004 | | |
| JP | 2004307236 | * 11/2004 | ............... | C01B 3/38 |
| JP | 2004307236 A | * 11/2004 | ............... | C01B 3/38 |
| JP | 2005-082409 | 3/2005 | | |
| JP | 2006076839 A | * 3/2006 | ............... | C01B 3/48 |
| JP | 2006-169068 A | 6/2006 | | |
| JP | 2006169068 A | * 6/2006 | ............... | C01B 3/48 |
| JP | 2007-051063 | 3/2007 | | |
| WO | WO 2006/088077 A1 | 8/2006 | | |
| WO | WO-2006/065634 A3 | 2/2007 | | |
| WO | WO 2007081016 A1 | * 7/2007 | ............... | H01M 8/06 |

OTHER PUBLICATIONS

Machine translation for Fujiwara et al., JP 2004-307236 A.*
Machine translation for Fujiwara et al., JP 2006-076839 A.*
Hand translation of Fujiwara et al., JP 2004-307236 A.*
Machine translation for Fujiwara et aol., JP 2006-169068 A.*
Extended European Search Report issued in European Patent Application No. 08790152.6 dated Sep. 20, 2012.

* cited by examiner

HYDROGEN GENERATION SYSTEM, FUEL CELL SYSTEM, AND METHOD FOR OPERATION OF HYDROGEN GENERATION SYSTEM

CROSS-REFERENCE TO RELATED APPLICATIONS

This application is a U.S. national phase application of PCT International Patent Application No. PCT/JP2008/001800 filed on Jul. 4, 2008, claiming the benefit of priority of Japanese Patent Application No. 2007-187250 filed on Jul. 18, 2007, all of which are incorporated by reference herein in their entirety.

TECHNICAL FIELD

The present disclosure relates to a hydrogen generating apparatus, a method for operating a hydrogen generating apparatus, and a fuel cell system. More particularly, it relates to a hydrogen generating apparatus having a converting device that performs shift reaction of carbon monoxide with a converting catalyst, a method for operating a hydrogen generating apparatus, and a fuel cell system.

BACKGROUND ART

A hydrogen-containing gas is used as an anode gas in a fuel cell. A steam reforming method is generally employed as a formation method of the hydrogen-containing gas.

Specifically, for example, a hydrogen generating apparatus used in a fuel cell system has a reforming device that generates a hydrogen-containing gas from a raw material and water through a steam reforming reaction, and a heating device that feeds heat required for the steam reforming reaction to the reforming device. The reforming device is equipped with a reformation catalyst. The hydrogen generating apparatus is so constituted that a raw material of a hydrocarbon series, such as natural gas, LPG, naphtha, gasoline and kerosene, or an alcohol series, such as methanol, and water are supplied to the reforming device from an external supply infrastructure, the reforming device is heated with the heating device to a temperature suitable for the steam reformation reaction (reformation reaction temperature), and a hydrogen-containing gas thus generated is delivered from the reforming device.

In the steam reformation reaction, carbon monoxide (which is hereinafter referred to as CO) is formed as a by-product, and the hydrogen-containing gas delivered from the reforming device contains CO in an amount of approximately 10 to 15%. Remaining water is also contained as steam. CO contained in the hydrogen-containing gas poisons an electrode catalyst of a fuel cell to lower the electric power generation capability, and thus a hydrogen generating apparatus used in a fuel cell system is equipped with a unit that decreases the CO concentration in the hydrogen-containing gas.

As the method of decreasing the CO concentration, shift reaction is ordinarily used, in which CO and steam are reacted and converted to hydrogen and carbon dioxide.

Accordingly, the hydrogen generating apparatus has a converting device that performs shift reaction of CO and steam in the hydrogen-containing gas, and the converting device is equipped with a converting catalyst. The hydrogen generating apparatus is so constituted that the hydrogen-containing gas is supplied to the converting device at a temperature suitable for the shift reaction (shift reaction temperature), and the hydrogen-containing gas decreased in CO concentration is discharged from the converting device. In many cases, the CO concentration in the hydrogen-containing gas is decreased to approximately 0.5% or less by the converting device.

For further decreasing CO, a CO removing device equipped with a selective oxidation catalyst is provided on the downstream side of the converting device, and CO in the hydrogen-containing gas is oxidized by supplying air to the CO removing device, thereby decreasing the CO concentration in the hydrogen-containing gas to 100 ppm, and preferably to 10 ppm or less. The hydrogen-containing gas containing hydrogen discharged from the CO removing device as a major component is supplied to a fuel cell for electric power generation.

As the converting catalyst, such a catalyst is used as a noble metal catalyst, e.g., platinum, ruthenium and rhodium, a Cu—Zn catalyst and a Fe—Cr catalyst.

Upon using a Cu—Zn catalyst as the converting catalyst among these catalysts, the shift reaction proceeds in a reducing atmosphere. Accordingly, for preventing the catalyst capability from being deteriorated, it is desirable to suppress the catalyst from being oxidized, thereby maintaining the reducing atmosphere even in the shutdown state of the hydrogen generating apparatus.

When steam remains inside the converting device in the shutdown state of the hydrogen generating apparatus, there are cases where the converting catalyst absorbs water produced by condensing the steam through a decrease in temperature, and the absorbed water is evaporated through an increase in temperature upon the next start-up, thereby disrupting the converting catalyst.

Accordingly, such a method is proposed that in the shutdown operation of the hydrogen generating apparatus, the temperature of the reformation catalyst is decreased while supplying the raw material and water, and when the temperature of the reformation catalyst reaches the prescribed temperature, at which thermal decomposition of the raw material occurs, (for example, 300° C. for butane gas) or lower, supply of water is stopped, and the converting device is purged with the raw material (see, for example, JP-A-2000-95504). According to the aforementioned shutdown operation, steam can be purged from the converting device as much as possible, and the catalyst can be suppressed from being oxidized.

Such a method is proposed that in the shutdown operation of the hydrogen generating apparatus, purge with steam is performed, and then after the temperature of the reformation catalyst layer is decreased to a temperature that is equal to or lower than the temperature, at which thermal decomposition of the raw material does not occur, and is equal to or higher than the condensation temperature of steam, the raw material is supplied to the converting device (see, for example, JP-A-2002-151124).

In the hydrogen generating apparatus of JP-A-2002-151124, the reforming device is purged with the raw material, and the raw material discharged from the reforming device is supplied to the converting device, thereby purging the converting device with the raw material. On the other hand, JP-A-2000-95504 discloses such a constitution that the raw material is supplied directly to the converting device from the raw material supplying device, thereby purging the converting device with the raw material independently from the purge of the reforming device with the raw material (see, for example, FIGS. 2 and 3 of JP-A-2000-95504).

The entire disclosure of JP-A-2000-95504 and JP-A-2002-151124 are incorporated herein by reference in its entirety.

DISCLOSURE OF THE INVENTION

Problems to be Solved by the Invention

JP-A-2000-95504 and JP-A-2002-151124 consider that the raw material purge is performed at a temperature that is lower than the temperature, at which thermal decomposition of the raw material does not occur on the reformation catalyst, and is equal to or higher than the temperature, at which water is not condensed, but do not consider the temperature of the converting catalyst on the raw material purge.

In the case where the converting device is purged with the raw material independently as shown in JP-A-2000-95504, the purge is performed based on the detected temperature of the reforming device, but the temperature of the converting catalyst is not considered.

As described above, the inventors have found that in the raw material purge in the shutdown operation of the hydrogen generating apparatus, if the control is performed without consideration of the temperature of the converting catalyst, there are cases where the converting catalyst is deteriorated, and in particular, if the raw material purge is performed when the converting catalyst is at a high temperature, the converting catalyst is deteriorated. The details of the phenomenon will be described below with reference to FIG. 2.

In view of the aforementioned problems, an object of the present disclosure is to provide a hydrogen generating apparatus, a method for operating a hydrogen generating apparatus and a fuel cell system, in which the deterioration of the converting catalyst can be further suppressed during the raw material purge in the shutdown operation.

Means for Solving the Problems

The $1^{st}$ aspect of the present disclosure is a hydrogen generating apparatus comprising:

a raw material supplying device that supplies a raw material;

a reforming device that contains a reformation catalyst and generates a hydrogen-containing gas from the raw material through a reformation reaction with the reformation catalyst;

a converting device that contains a converting catalyst and decreases carbon monoxide in the hydrogen-containing gas through a shift reaction with the converting catalyst;

a first temperature detector that detects a temperature of the converting catalyst; and a controlling device, the controlling device controlling the raw material supplying device to purge an interior of the converting device with the raw material when a detected temperature of the first temperature detector becomes a first threshold value, at which deterioration of the converting catalyst with the raw material is suppressed, or lower in a shutdown operation.

The $2^{nd}$ aspect of the present disclosure is the hydrogen generating apparatus according to the $1^{st}$ aspect of the present disclosure, wherein the apparatus comprises a cooling device that cools the converting catalyst, and the controlling device cools the converting catalyst with the cooling device and performs the control in a shutdown operation.

The $3^{rd}$ aspect of the present disclosure is the hydrogen generating apparatus according to the $1^{st}$ aspect of the present disclosure, wherein the apparatus comprises a cooling device that cools the converting catalyst, and the controlling device controls the cooling device in such a manner that the detected temperature of the first temperature detector becomes the first threshold value or lower before purging an interior of the reforming device and the interior of the converting device, with the raw material.

The $4^{th}$ aspect of the present disclosure is the hydrogen generating apparatus according to the $1^{st}$ aspect of the present disclosure, wherein the controlling device controls the raw material supplying device to purge an interior of the converting device with the raw material when a detected temperature of the first temperature detector is the first threshold value or lower and is higher than a dew point of a gas in the converting device.

The $5^{th}$ aspect of the present disclosure is the hydrogen generating apparatus according to the $1^{st}$ aspect of the present disclosure, wherein the apparatus comprises a second temperature detector that detects a temperature of the reformation catalyst, and the controlling device performs the control when a detected temperature of the first temperature detector is the first threshold value or lower, and a detected temperature of the second temperature detector becomes a second threshold value, at which deterioration of the reformation catalyst with the raw material is suppressed, or lower.

The $6^{th}$ aspect of the present disclosure is the hydrogen generating apparatus according to the $5^{th}$ aspect of the present disclosure, wherein the apparatus comprises a heating device that heats the reformation catalyst, and a cooling device that cools the converting catalyst, and in a shutdown operation, the controlling device stops the heating device and controls the cooling device in such a manner that the detected temperature of the first temperature detector becomes the first threshold value or lower at the time when the detected temperature of the second temperature detector becomes the second threshold value or lower or before the time when it becomes the second threshold value or lower.

The $7^{th}$ aspect of the present disclosure is the hydrogen generating apparatus according to the $2^{nd}$ aspect of the present disclosure, wherein the cooling device is a cooling fan.

The $8^{th}$ aspect of the present disclosure is the hydrogen generating apparatus according to the $6^{th}$ aspect of the present disclosure, wherein the cooling device is a cooling fan.

The $9^{th}$ aspect of the present disclosure is the hydrogen generating apparatus according to the $1^{st}$ aspect of the present disclosure, wherein the apparatus comprises a cooling device that cools the converting catalyst, and a heating device that heats the reformation catalyst, the heating device contains a fuel supplying part that supplies a fuel for combustion and an air supplying part that supplies air for combustion, and the air supplying part also functions as the cooling device.

The $10^{th}$ aspect of the present disclosure is the hydrogen generating apparatus according to the $1^{st}$ aspect of the present disclosure, wherein the converting catalyst contains Cu and Zn.

The $11^{th}$ aspect of the present disclosure is a fuel cell system comprising:

the hydrogen generating apparatus according to the $1^{st}$ aspect of the present disclosure, and a fuel cell that generates electric power by using the hydrogen-containing gas supplied from the hydrogen generating apparatus.

The 12th aspect of the present disclosure is a method for operating a hydrogen generating apparatus, the hydrogen generating apparatus comprising:

a raw material supplying device that supplies a raw material;

a reforming device that contains a reformation catalyst and generates a hydrogen-containing gas from the raw material and water through reformation reaction with the reformation catalyst;

a converting device that contains a converting catalyst and decreases carbon monoxide in the hydrogen-containing gas through shift reaction with the converting catalyst; and a first temperature detector that detects a temperature of the converting catalyst, and the method comprising a purging step of purging an interior of the converting device with the raw material by the raw material supplying device when a detected temperature of the first temperature detector becomes a first threshold value, at which deterioration of the converting catalyst with the raw material is suppressed, or lower in a shutdown operation.

The 13th aspect of the present disclosure is the method for operating the hydrogen generating apparatus according to the 12th aspect of the present disclosure, wherein the purging step is performed when a detected temperature of the first temperature detector is the first threshold value or lower and is higher than a dew point of a gas in the converting device.

The 14th aspect of the present disclosure is the method for operating the hydrogen generating apparatus according to the 12th aspect of the present disclosure, wherein the hydrogen generating apparatus comprises a second temperature detector that detects a temperature of the reformation catalyst, and the purging step is performed when a detected temperature of the first temperature detector is the first threshold value or lower, and a detected temperature of the second temperature detector becomes a second threshold value, at which deterioration of the reformation catalyst with the raw material is suppressed, or lower.

The 15th aspect of the present disclosure is the method for operating the hydrogen generating apparatus according to the 14th aspect of the present disclosure, wherein the hydrogen generating apparatus comprises a heating device that heats the reformation catalyst, and a cooling device that cools the converting catalyst, and the method comprising a cooling step of, in a shutdown operation, stopping the heating device and cooling the converting catalyst by the cooling device in such a manner that the detected temperature of the first temperature detector becomes the first threshold value or lower at the time when the detected temperature of the second temperature detector becomes the second threshold value or lower or before the time when it becomes the second threshold value or lower.

Advantage of the Present Disclosure

According to the present disclosure, a hydrogen generating apparatus, a method for operating a hydrogen generating apparatus and a fuel cell system are provided that can suppress deterioration in capability of a converting catalyst on raw material purge during a shutdown operation.

Figure 1:
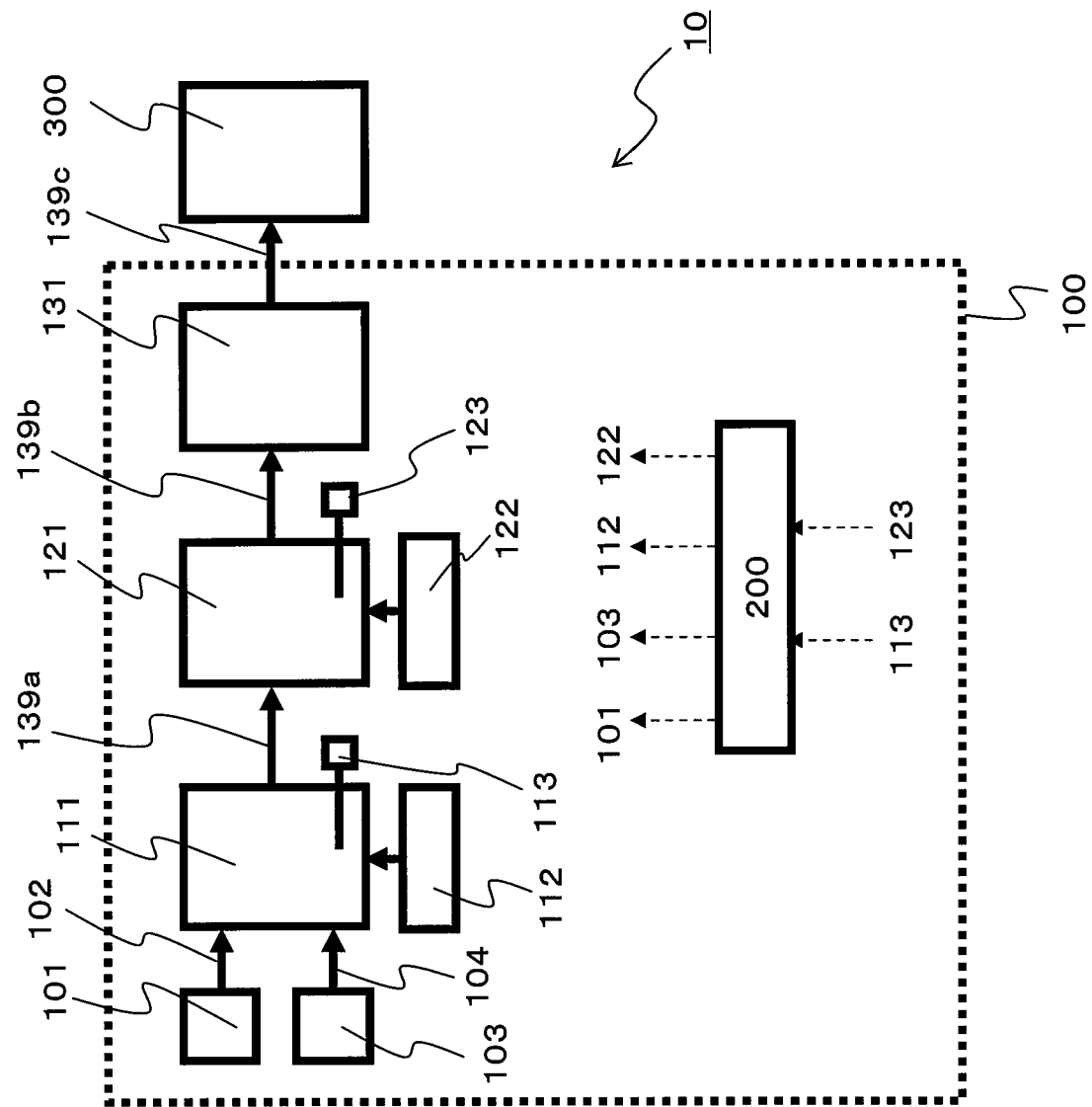
FIG. 1 is an exemplary schematic illustration showing a constitution of a fuel cell system in an embodiment of the present disclosure.

DESCRIPTION OF THE REFERENCE NUMERALS AND SIGNS 100 hydrogen generating apparatus
101 raw material supplying device
102 raw material supplying path
103 water supplying device
104 water supplying path
111 reforming device
112 heating device
113 second temperature detector
121 converting device
122 cooling fan
123 first temperature detector
131 CO removing device
139a, 139b, 139c hydrogen-containing gas path
200 controlling device
300 fuel cell

DETAILED DESCRIPTION

A detailed description of the present disclosure will be described below with reference to the drawings.

Embodiment 1

FIG. 1 is an exemplary schematic illustration showing a constitution of a fuel cell system 10 of an embodiment 1 according to the present disclosure. The fuel cell system 10 of the embodiment 1 has a hydrogen generating apparatus 100 and a fuel cell 300.

The fuel cell (FC) 300 is such an apparatus that uses a hydrogen-containing gas supplied from the hydrogen generating apparatus 100 as an anode gas and uses an oxidizing gas, such as air, supplied separately as a cathode gas, thereby generating electric power through reaction between them.

The hydrogen generating apparatus 100 has a reforming device 111, a converting device 121 disposed on the downstream side of the reforming device 111, and a carbon monoxide removing device (which is hereinafter referred to as a CO removing device) 131 disposed on the downstream side of the converting device 121. A raw material supplying device 101, which is a supplying system of a raw material, a raw material supplying path 102 connected to the raw material supplying device 101, a water supplying device 103, which is a supplying system of water, and a water supplying path 104 connected to the water supplying device 103 are provided.

The raw material supplying path 102 and the water supplying path 104 are connected to the reforming device 111. A heating device 112 that supplies heat to the reforming device 111, and a second temperature detector 113 that detects the temperature in the reforming device 111 are provided.

A cooling fan 122, which is an example of a cooling device of the present disclosure that cools the converting device 121, and a first temperature detector 123 that detects the temperature in the converting device 121 are provided.

A hydrogen-containing gas path 139*a* that connects the reforming device 111 and the converting device 121, a hydrogen-containing path 139*b* that connects the converting device 121 and the CO removing device 131, and a hydrogen-containing gas path 139*c* that connects the CO removing device 131 and the fuel cell 300 are provided, and the hydrogen-containing gas generated in the reforming device 111 is supplied to the fuel cell 300 through the hydrogen-containing gas paths 139*a*, 139*b* and 139*c*.

A controlling device 200 that controls the aforementioned devices is provided. The cooling device is not limited to the cooling fan 122, and may be a constitution that cools with water, or a constitution that can cool the converting catalyst with air delivered by a fan used for combustion in the heating device 112.

As the raw material, a raw material containing an organic compound constituted by a carbon element and a hydrogen element is preferably used, examples of which include a hydrocarbon, such as natural gas, LPG, naphtha, gasoline and kerosene, or an alcohol series, such as methanol.

The reforming device 111 has a reformation catalyst disposed therein. Steam reformation reaction proceeds with the reformation catalyst, whereby a hydrogen-containing gas can be generated from the raw material and steam. Heat required for the steam reformation reaction is supplied from the heating device 112. As the reforming catalyst, generally at least one selected from the group consisting of a noble metal catalyst, such as platinum (Pt), ruthenium (Ru) and rhodium (Rh), and a nickel (Ni) catalyst is preferably used.

The converting device 121 has a converting catalyst disposed therein. Shift reaction proceeds with the converting catalyst, whereby hydrogen and carbon dioxide can be generated from carbon monoxide and water in the hydrogen-containing gas delivered from the reforming device 111. As the converting catalyst, generally at least one selected from the group consisting of a noble metal catalyst, such as Pt, Ru and Rh, a copper-zinc (Cu—Zn) catalyst and an iron-chromium (Fe—Cr) catalyst is preferably used.

The CO removing device 131 has a selective oxidation catalyst disposed therein. Selective oxidation reaction of CO proceeds with the selective oxidation catalyst, whereby carbon monoxide in the hydrogen-containing gas after subjecting to shift reaction can be further decreased. As the selective oxidation catalyst, a Pt catalyst or a Ru catalyst is preferably used.

In the embodiment, the fuel cell 300 is a polymer electrolyte fuel cell (PEFC), and therefore, it is necessary to further decrease the carbon monoxide concentration with the selective oxidation catalyst to prevent the catalyst capability of the PECF from being deteriorated. Accordingly, the CO removing device 131 may be omitted depending on the destination of the hydrogen-containing gas. For example, in the case where the fuel cell 300 is a phosphoric acid fuel cell (PAFC), the CO removing device 131 may be omitted.

The heating device 112 is so constituted that an amount of heat that is required for the steam reformation reaction can be supplied to the reforming device 111. In the embodiment, the heating device 112 has a burner for burning a combustible gas, such as the raw material and the hydrogen-containing gas, an igniting device, and a gas supplying device, such as a fan and a pump, that supplies an oxidizing gas, such as air, (which are not shown in the figures). The heating device 112 is so constituted that the heating temperature can be controlled by adjusting the supplying amount of the combustible gas. According to the constitution, the reforming device 111 can be heated to a temperature suitable for the steam reformation reaction (reformation reaction temperature).

The controlling device 200 includes a computer, such as a microcomputer, and has a function of controlling the raw material supplying device 101, the water supplying device 103, the heating device 112 and the cooling fan 122, and is so constituted that the temperature information from the second temperature detector 113 and the first temperature detector 123 can be acquired.

The controlling device 200 includes not only a single controlling device but may also be formed by a group of controlling units that perform the control by plural controlling units collaborating with one another. Accordingly, the controlling device 200 may not be constituted by a single controlling device, but may be so constituted by plural controlling units which are distributed and which control the hydrogen generating apparatus 100 in cooperation with each other.

An example of operation of the hydrogen generating apparatus 100 in an electric power generation operation will be described with reference to FIG. 1. The operation is performed by controlling with the controlling device 200.

The raw material supplying device 101 is controlled to supply the raw material to the reforming device 111 through the raw material supplying path 102.

The water supplying device 103 is controlled to supply water to the reforming device 111 through the water supplying path 104. The supplying amount of water is preferably such a flow amount that provides a steam (molar amount of $H_2O$ molecules in water supplying amount per unit time)/ carbon (molar amount of C atoms in raw material supplying amount per unit time) ratio of approximately 2.5 to 3.

The reforming device 111 is heated to a temperature suitable for the steam reformation reaction (reformation reaction temperature) with the heating device 112. The heating temperature is controlled based on the detected temperature of the second temperature detector 113. In the embodiment, a Ru catalyst is used as the reformation catalyst, and therefore, it is preferred to heat with the heating device 112 to a temperature of approximately 650° C. detected by the second temperature detector 113.

According to the control, in the reforming device 111, a hydrogen-containing gas is efficiently generated through the steam reformation reaction from the mixed gas of the raw material and steam.

The hydrogen-containing gas is supplied to the converting device 121, and the carbon monoxide concentration of the hydrogen-containing gas is decreased through the shift reaction. The temperature of the converting device 121 is controlled to a temperature suitable for the shift reaction (shift reaction temperature). The converting device 121 is so constituted that it is heated with the heat from the heating device 112 remaining after heating the reforming device 111, and therefore, the temperature of the converting device 121 is controlled by adjusting the heat amount remaining after heating the reforming device 111 by adjusting the heating amount of the heating device 112 based on the detected temperature of the first temperature detector 123. However, the temperature control is not limited to this constitution, and it is possible to provide a separate heating device utilizing electric resistance and to utilize external waste heat.

In the embodiment, a Cu—Zn converting catalyst is used as the converting catalyst. The temperature is controlled so that the temperature detected by the first temperature detector 123 is approximately 200 to 300° C.

The hydrogen-containing gas discharged from the converting device 121 is supplied to the CO removing device 131, thereby further decreasing the carbon monoxide concentration of the hydrogen-containing gas through the selective oxidation reaction of carbon monoxide. The temperature of the CO removing device 131 is controlled to a temperature suitable for the selective oxidation reaction (selective oxidation reaction temperature). The CO removing device 131 is so constituted that it is heated with the heat from the heating device 112 remaining after heating the reforming device 111, and therefore, the temperature of the CO removing device 131 is controlled by adjusting the heat amount from the heating device 112 remaining after heating the converting device 121 by adjusting the heating amount of the heating device 112. However, the temperature control is not limited to this constitution, and it is possible to provide a separate heating device utilizing electric resistance and to utilize external waste heat. In the embodiment, the CO removing device 131 is heated to a temperature within a range of approximately 100 to 200° C.

The hydrogen-containing gas delivered from the CO removing device 131 is supplied as an anode gas to the fuel cell 300 through the hydrogen-containing gas path 139c. An oxidizing gas, such as air, is separately supplied as a cathode gas (which is not shown in the figure) to the fuel cell 300, and the fuel cell 300 generates electric power through electrochemical reaction. According to the process, a hydrogen-containing gas that has been sufficiently decreased in carbon monoxide can be generated by operating the hydrogen generating apparatus 100, whereby the fuel cell 300 can perform electric power generation.

Upon shutting down the fuel cell in the electric power generation state, the hydrogen generating apparatus is subjected to a shutdown operation. The shutdown operation of the hydrogen generating apparatus will be described in detail below, and the shutdown operation is completed finally after purging the interior thereof with the raw material, as described in JP-A-2000-95504 and JP-A-2002-151124. Accordingly, the inventors have investigated as to whether the passage of the raw material upon the shutdown operation influences the characteristics of the converting catalyst.

The investigation results of the characteristics of the Cu—Zn converting catalyst used in the converting device 121 of the embodiment will be described with reference to an experimental example shown in FIG. 2.

Figure 2:
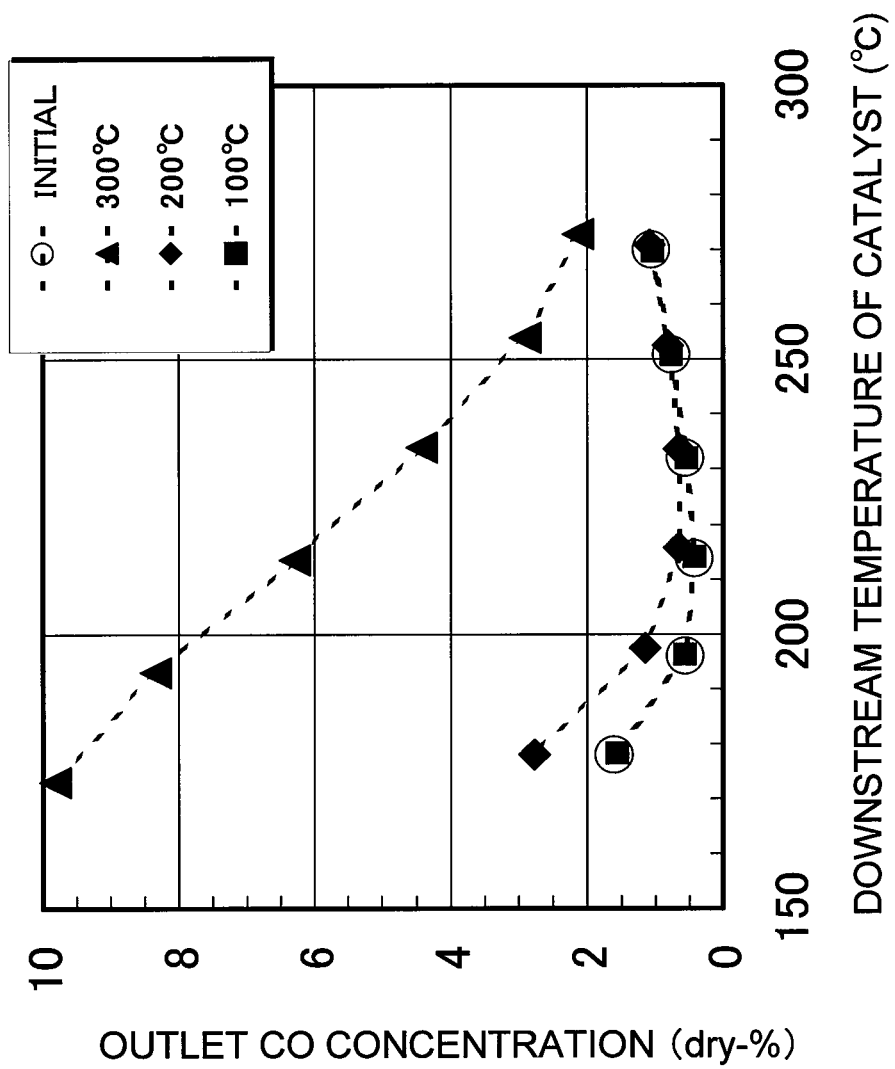
FIG. 2 is a graph showing temperature characteristics of a converting catalyst before and after passing a raw material through the catalyst.

FIG. 2 is a graph showing the results of a comparison of the characteristics of the converting catalyst before and after the passage of the raw material by disposing the converting catalyst in a fixed bed passage reaction apparatus equipped with an electric furnace.

The plots in FIG. 2 are the results (temperature characteristics) obtained in such a manner that a simulated hydrogen-containing gas corresponding to the gas after passing through the reforming device is passed through the converting catalyst, and the temperature of the converting catalyst is changed, at which the carbon monoxide concentration in the simulated hydrogen-containing gas after passing through the converting catalyst is measured with gas chromatography.

The converting catalyst used was a commercially available Cu—Zn catalyst (produced by Süd-Chemie Catalysts, Inc.), and 20 cc thereof was charged in a reaction tube. The temperature characteristics of the catalyst were measured by decreasing the set temperature of the electric furnace supplying heat to the reaction tube having the converting catalyst charged therein while passing a simulated hydrogen-containing gas (hydrogen: 57%, carbon monoxide: 9%, carbon dioxide: 8%, steam: 26%) at 300 mL/min.

The plots for "initial" (white circles) in FIG. 2 show the temperature characteristics (initial characteristics) measured under the aforementioned conditions after the converting catalyst is charged in the reaction tube and subjected to a reduction treatment.

The method for passing the raw material for investigating the influence of the raw material purge will be described.

After measuring the temperature characteristics, heat was applied to the converting catalyst with the electric furnace to a temperature of 300° C., and while maintaining the temperature, a desulfurized city gas as the raw material was passed therethrough at a flow rate of 200 mL/min for 100 hours.

After passing the city gas, the simulated hydrogen-containing gas was passed through the converting catalyst to measure the temperature characteristics as similar to the measurement of the initial temperature characteristics. The results are shown by the plots for "300° C." (black triangles) in FIG. 2.

What is understood from the results will be described below.

It is understood from FIG. 2 that in the case where the catalyst is in the initial state, for example, CO can be decreased to approximately 0.5 dry % at a catalyst temperature of 200° C., but after passing the city gas, it can be decreased only to approximately 8 dry % at the same catalyst temperature. That is, it shows deterioration of the catalyst.

The catalyst was then replaced by a fresh one, which was subjected to a reduction treatment, and the temperature characteristics of the replaced catalyst were measured, thereby confirming that the initial characteristics of the replaced catalyst were equivalent to the aforementioned characteristics (i.e., the plots for "initial" in FIG. 2) (not shown in the figure).

Thereafter, heat was applied to the converting catalyst with the electric furnace to a temperature of 200° C., and a desulfurized city gas was passed therethrough at a flow rate of 200 mL/min for 100 hours. Thereafter, the simulated hydrogen-containing gas was passed through the converting catalyst to measure the temperature characteristics. The results are shown by the plots for "200° C." (black rhombuses) in FIG. 2. It is understood from the results that the decrease in characteristics is suppressed as compared to the case where the city gas is passed at 300° C., but the catalyst capability is decreased from the initial characteristics.

The catalyst was then replaced and subjected to a reduction treatment, and the temperature characteristics of the replaced catalyst were measured. Thereafter, heat was applied to the converting catalyst with the electric furnace to a temperature of 100° C., and a desulfurized city gas was passed therethrough at a flow rate of 200 mL/min for 100 hours. Thereafter, the temperature characteristics were measured. The results are shown by the plots for "100° C." in FIG. 2. It is understood that substantially no decrease in characteristics is observed after passing the city gas at 100° C.

As described above, the inventors have found from the results shown in FIG. 2 that upon passing a raw material, the temperature of the converting catalyst is desirably as low as possible since deterioration in capability of the converting catalyst is suppressed.

Accordingly, upon performing raw material purge in a shutdown operation after the normal operation at a temperature of the converting catalyst of 300° C., it is necessary to consider the temperature of the converting catalyst. Furthermore, when decrease of the temperature of the converting catalyst does not proceed before performing the raw material purge, it is necessary to cool the converting catalyst by any suitable measure.

The shutdown operation of the hydrogen generating apparatus 100, which is a characteristic feature of the present disclosure, will be described, and an example of the method for operating the hydrogen generating apparatus of the present disclosure will be described simultaneously.

Figure 3:
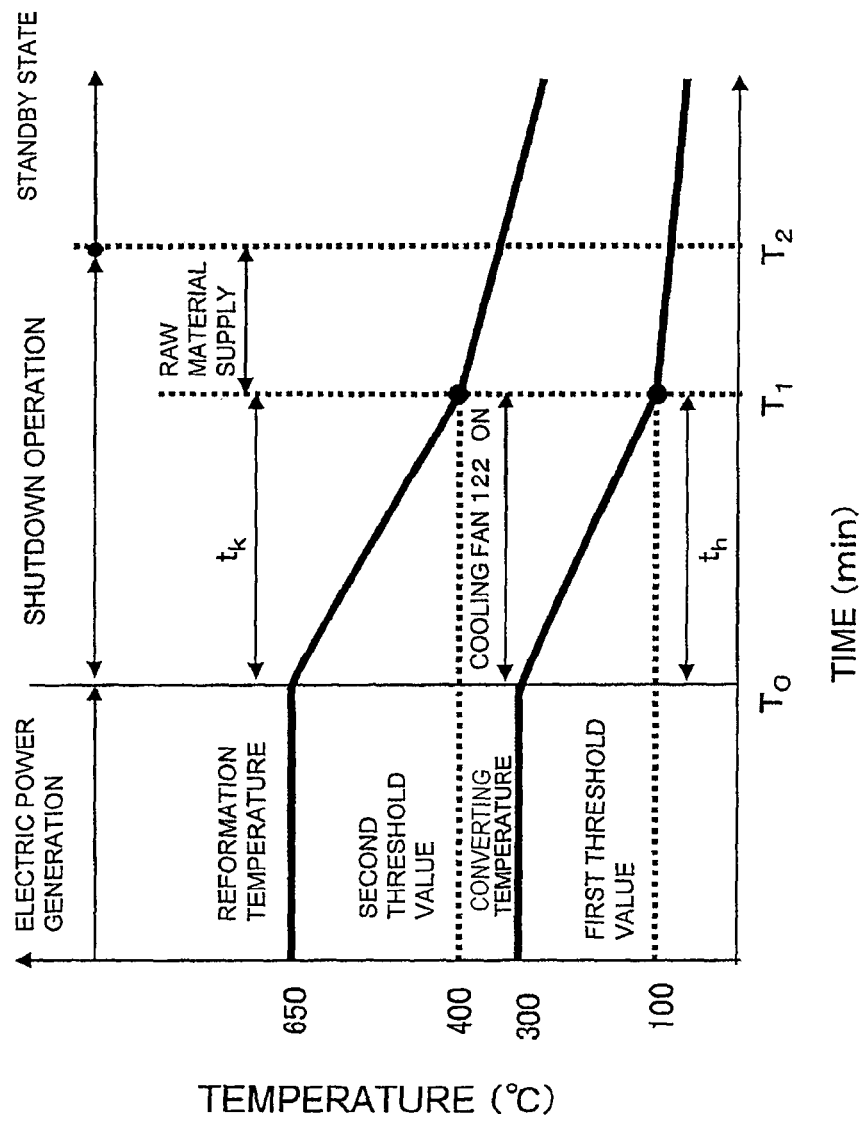
FIG. 3 is a graph showing temperature transition in a shutdown operation of a hydrogen generating apparatus in an embodiment of the present disclosure.

FIG. 3 is a schematic illustration showing a graph of temperature transition detected by the second temperature detector 113 and the first temperature detector 123 in the electric power generation to the shutdown operation. In FIG. 3, the temperature detected by the second temperature detector 113 is shown as the reformation temperature, and the temperature detected by the first temperature detector 123 is shown as the modification temperature. The same is applied to FIGS. 4 and 5 described later.

In the embodiment, the control is so performed during the electric power generation that the reformation temperature is 650° C., and the converting temperature is 300° C.

Upon shutting down electric power generation, the controlling device 200 stops heating with the heating device 112 and stops supply of the raw material and water by stopping the operation of the raw material supplying device 101 and the water supplying device 103. The time when supply of the raw material and water is stopped corresponds to the time $T_0$ in FIG. 3.

When heating with the heating device 112 is stopped, the temperature of the reformation catalyst is decreased. When the operation of the raw material supplying device 101 and the water supplying device 103 is stopped, the flow of the hydrogen-containing gas heated with the heating device 112 into the converting device 121 is stopped to decrease the temperature of the converting catalyst, but it is not directly heated like the reformation catalyst, and therefore the temperature thereof is decreased more gradually as compared to the reformation catalyst.

Accordingly, such control is performed that the cooling fan 122 is driven immediately after stopping supply of the raw material and water, thereby cooling the converting catalyst. The control corresponds to an example of the cooling process of the present disclosure.

When the temperature detected by the second temperature detector 113 becomes the second threshold value, at which the raw material is not heat-decomposed on the reformation catalyst, (for example, 400° C.) or lower, and the temperature detected by the first temperature detector 123 becomes the first threshold value, at which deterioration of the converting catalyst with the raw material is suppressed, (for example, 100° C.) or lower, the operation of the raw material supplying device 101 is started to start supply of the raw material for purging the hydrogen-containing gas accumulated in the hydrogen generating apparatus 100. The time when supply of the raw material is started corresponds to the time $T_1$ in FIG. 3. An example of the temperature, at which deterioration of the converting catalyst with the raw material is suppressed, in the present disclosure corresponds to the first threshold value of the embodiment, and an example of the temperature, at which deterioration of the reformation catalyst with the raw material is suppressed, in the present disclosure corresponds to the second threshold value of the embodiment. The first threshold value set with respect to the temperature of the converting catalyst may be such a temperature that deterioration of the converting catalyst with the raw material can be suppressed, and thus may not be 100° C., but may be, for example, 200° C. However, in order that the hydrogen generating apparatus maintains the carbon monoxide concentration in the hydrogen-containing gas supplied to the fuel cell to 10 ppm even when the characteristics of the converting catalyst are deteriorated due to repetition of start and stop, it is preferred to charge in advance such an amount of the catalyst that takes the decrease in catalyst characteristics into consideration to some extent. The temperature of the converting catalyst when the raw material purge is started, is preferably a temperature higher than the dew point of the gas supplied to the converting device 121.

In the embodiment, as shown in FIG. 3, the cooling fan 122 is controlled by the controlling device 200 while monitoring the detected temperature of the second temperature detector 113 and the detected temperature of the first temperature detector 123 in such a manner that the period of time $t_k$ from the stop of the heating device 112 to the time when the detected temperature of the second temperature detector 113 becomes the second threshold value (for example, 400° C.) or lower is substantially equal to the period of time $t_h$ to the time when the detected temperature of the first temperature detector 123 becomes the first threshold value (for example, 100° C.) or lower (see $T_1$ in FIG. 3). By controlling $t_h$ and $t_k$ to make them substantially the same as each other, there is no latency time arising after the reformation catalyst reaches the temperature, at which the raw material can be supplied thereto, until the converting catalyst reaches the temperature, at which the raw material can be supplied thereto, whereby the period of time required for the shutdown operation can be shortened as much as possible.

The period of time $t_k$ from the stop of the heating device 112 to the time when the temperature of the reformation catalyst reaches 400° C. is substantially constant, and the period of time $t_k$ can be obtained in advance by actual measurement. Accordingly, it is possible that the period of time $t_k$ obtained by actual measurement is set as a fixed value, and the controlling device 200 operates the cooling fan 122 while monitoring the detected temperature of the first temperature detector 123 and the period of time $t_h$ in such a manner that the period of time $t_k$ and the period of time $t_h$ are made substantially equal to each other, or it is also possible that the controlling method of the cooling fan 122 that makes the period of time $t_k$ and the period of time $t_h$ substantially equal to each other is determined in advance by experiment, and the controlling method is stored as a controlling program in a recording medium. By operating the cooling fan 122 with the controlling device 200 based on the controlling program in the recording medium, such control can be performed so that $t_h$ and $t_k$ are substantially equal to each other.

In the embodiment, the cooling fan 122 is controlled with the controlling device 200 to make the period of time $t_k$ and the period of time $t_h$ substantially equal to each other, but they may not be necessarily equal to each other, and the similar advantage can be obtained by controlling the cooling fan 122 in such a manner that the detected temperature of the first temperature detector 123 becomes the first threshold value (for example, 100° C.) or lower within the period until the detected temperature of the second temperature detector 113 becomes the second threshold value (for example, 400° C.) or lower.

Figure 4:
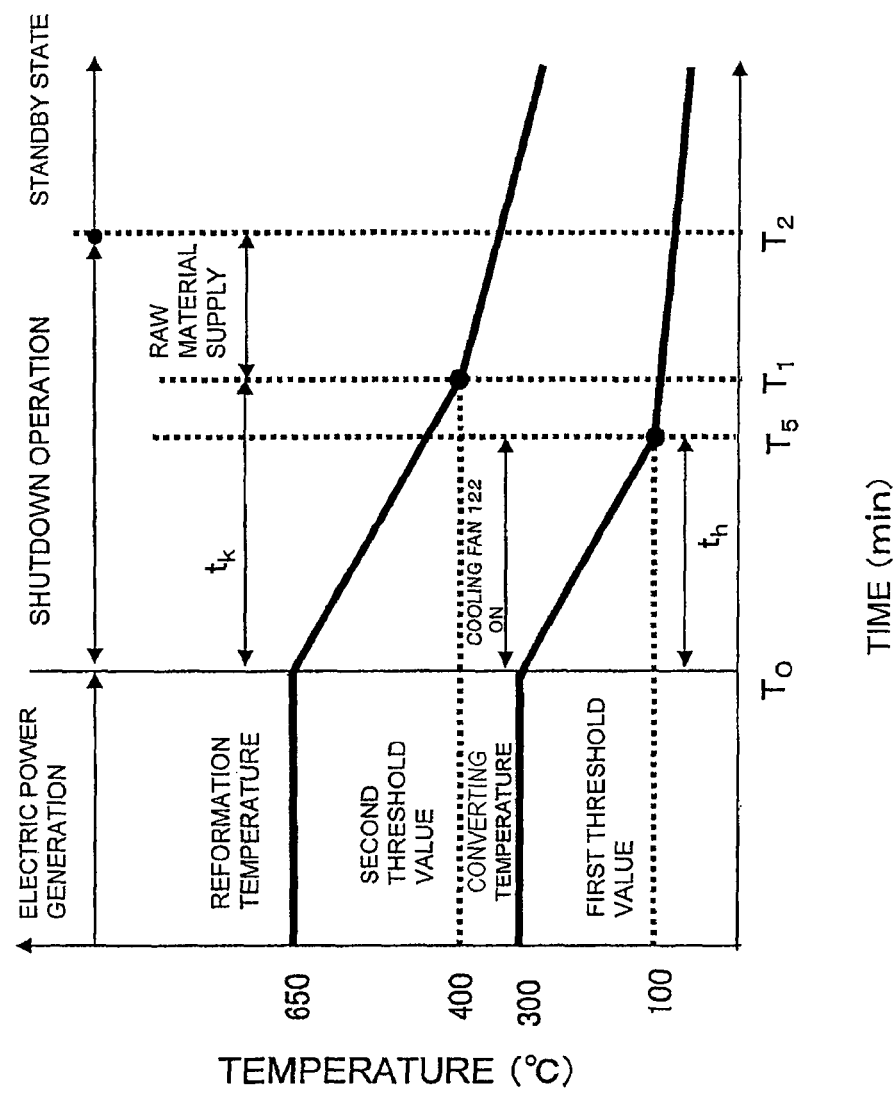
FIG. 4 is a graph showing temperature transition in a shutdown operation of a hydrogen generating apparatus in a modified example of an embodiment of the present disclosure.

For example, as shown in FIG. 4, the cooling fan 122 may be controlled in such a manner that the period of time $t_h$ until the temperature of the converting temperature becomes the first threshold value or lower is shorter than the period of time $t_k$ until the temperature of the reformation catalyst becomes the second threshold value or lower. However, it is preferred that the cooling fan 122 is stopped at the time when the temperature of the converting catalyst detected by the first temperature detector 123 is higher than the dew point of the gas passing on the converting catalyst and is the third threshold value (for example, 100° C.) close to the dew point or lower (for example, time $T_5=T_0+t_h$), and the raw material is supplied after the time $T_1$ of lapsing the period of time $t_k$ from the time $T_0$ to the time when the temperature of the reformation catalyst reaches the second threshold value (for example, 400° C.) or lower. The operation of the cooling fan 122 is controlled to be stopped when the temperature becomes the third threshold value or lower because even when the gas supplied to the converting device 121 is cooled to the dew point or lower, the effect of suppressing deterioration in the characteristics of the converting catalyst due to supply of the raw material is not so changed, and furthermore, there is such a possibility that steam in the gas supplied to the converting catalyst is condensed on the catalyst to deteriorate the characteristics of the catalyst.

Figure 5:
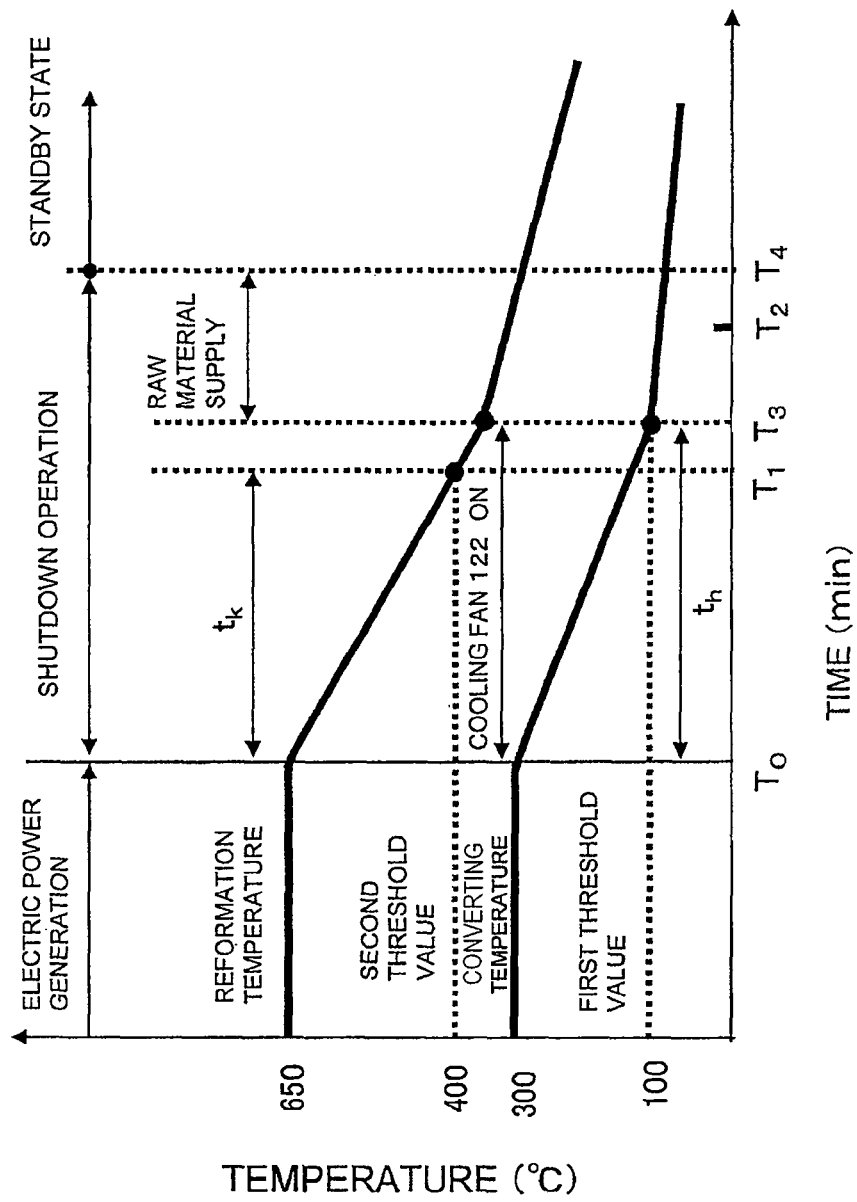
FIG. 5 is a graph showing temperature transition in a shutdown operation of a hydrogen generating apparatus in a modified example of an embodiment of the present disclosure.

Although the period of time required for the shutdown operation becomes longer than the previous embodiment, the period of time $t_h$ until the converting catalyst reaches 100° C. may be controlled longer than the period of time $t_k$ until the reformation catalyst reaches 400° C., as shown in FIG. 5. In this case, as the time of lapsing the period of time $t_h$ from the time $T_0$ is represented by $T_3$, the supply of the raw material is started at the time $T_3$, which is later than the time $T_1$ of lapsing the period of time $t_k$ from the time $T_0$, and thus the time when the supply of the raw material is completed becomes the time $T_4$, which is later than the time $T_2$ in FIG. 3.

In the cooling process of the shutdown operation shown in FIGS. 3 to 5, the first threshold value and the third threshold value are the same and are both 100° C., and the operation of the cooling fan 122 is stopped upon starting the raw material purge. However, for example, it is possible that the first threshold value is 200° C. and the third threshold value is 100° C., and in this case where the first threshold value is larger than the third threshold value, the cooling operation with the cooling fan 122 may be continued during the raw material purge within the period until the temperature of the converting catalyst becomes the third threshold value or lower.

In the cooling process after the time $T_0$ when the shutdown operation of the hydrogen generating apparatus is started, not only the converting catalyst is cooled with the cooling fan 122, but also a unit for cooling the reformation catalyst may be provided, and the reformation catalyst may be simultaneously cooled with the cooling unit. For example, a fan may be provided on the heating device 112, and air may be supplied with the fan to cool the reformation catalyst.

A specific constitution of the hydrogen generating apparatus 100 having the heating device 112 equipped with a fan will be described below.

Figure 6:
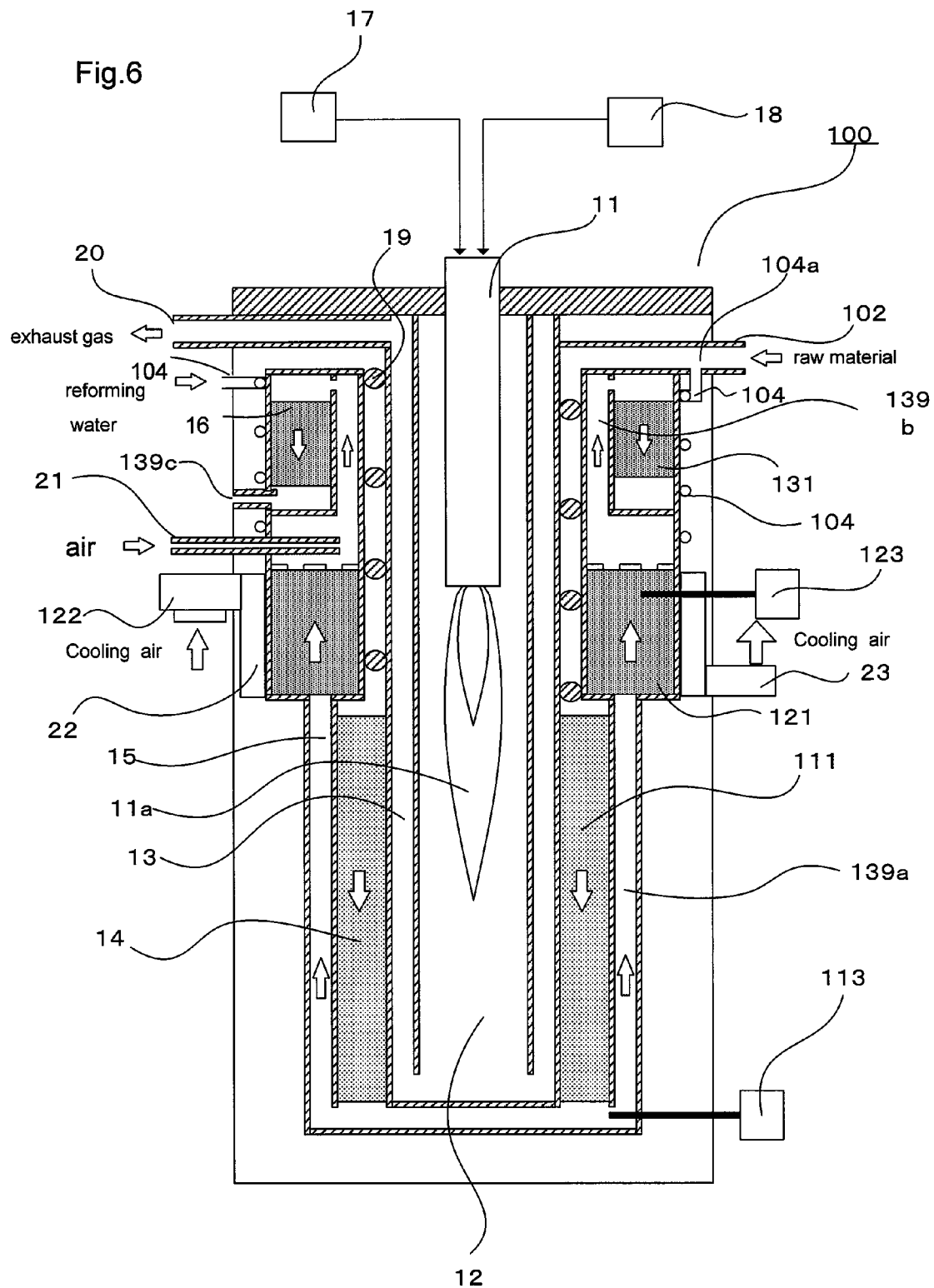
FIG. 6 is a cross sectional constitutional view showing an example of a specific structure of a hydrogen generating apparatus in an embodiment of the present disclosure.

FIG. 6 is a cross sectional constitutional view of the hydrogen generating apparatus 100. The hydrogen generating apparatus 100 is in a cylindrical form, and has a combustion space 12 having a burner 11 disposed therein, and plural annular spaces constituted by plural pipes disposed concentrically with the combustion space 12 as the center. The plural annular spaces means a first annular space 13 formed outside the combustion space 12 containing the burner 11, a second annular space 14 formed outside the first annular space 13, a third annular space 15 formed outside the second annular space 14, and a fourth annular space 16 formed above the third annular space 15.

An air supplying part 17 having a fan for supplying air for combustion to the burner 11, and a fuel supplying part 18 that supplies a combustible gas, which is an example of the fuel of the present disclosure, to the burner 11 are provided, and the heating device 112 equipped with a fan is constituted by the burner 11, the air supplying part 17 and the fuel supplying part 18. The raw material supplying part 101 may function as the fuel supplying part 18, the fuel supplying part 18 may be so constituted that off-gas from the fuel cell 300 is supplied.

The second annular space 14 is formed in such a manner that the width of the lower part of the annular space is larger than the upper part of the annular space, and the reformation catalyst is charged in the lower part of the annular space to constitute the reforming device 111.

The third annular space 15 is formed in such a manner that the width of the upper part of the annular space is larger than the lower part of the annular space, and the converting catalyst is charged in the upper part of the annular space to constitute the converting device 121. In the third annular space 15, the fourth annular space 16 is formed above the converting device 121, and the selective oxidation catalyst is charged in the fourth annular space 16 to constitute the CO removing device 131.

The raw material supplying path 102 shown in FIG. 1 is connected to the upper part of the second annular space 14, the second annular space 14 and the third annular space 15 are connected at the lower part, the third annular space 15 and the fourth annular space 16 are connected at the upper part, and the hydrogen-containing gas path 139c to the fuel cell is connected to the lower part of the fourth annular space 16.

Accordingly, the raw material supplied from the raw material supplying path 102 moves downward in the second annular space 14 through the reforming device 111, then moves upward in the third annular space 15 through the converting device 121, then moves downward in the fourth annular space 16 through the CO removing device 131, discharged from the hydrogen generating apparatus 100, and directed to the fuel cell 300 through the hydrogen-containing gas path 139c. In the upper annular space of the second annular space 14, a wall 19 is formed as running downward and moving in the circumferential direction, thereby heating the supplied raw material sufficiently with heat from the burner 11.

The burner 11 is disposed to form a flame 11a directed downward, and an exhaust gas formed through combustion with the burner 11 moves from the lower part of the combustion space 12 to the first annular space 13, moves upward in the first annular space 13, and discharged outside the hydrogen generating apparatus 100 from the upper part of the first annular space 13 through an exhaust gas outlet 20. The reforming device 111, the converting device 121 and the CO removing device 131 are heated with the combustion heat conducted through the chassis, thereby performing reaction in each of them.

The water supplying path 104 is wound around the CO removing device 131 and then, connected to the raw material supplying path 102. The connecting part thereof is shown by 104a in the figure. Water flowing in the water supplying path 104 is heated with the CO removing device 131 upon flowing around the CO removing device 131.

A cooling air flow path 22 for cooling the converting device 121 is formed around the converting device 121, and a cooling fan 122 for taking cooling air into the cooling air flow path 22, and a flow outlet 23 for discharging air from the cooling air flow path 22 are provided.

The first temperature detector 123 and the second temperature detector 113 described in FIG. 1 are shown in FIG. 6, and the second temperature detector 113 is disposed on the downstream side of the reformation catalyst.

While omitted in FIG. 1, an air supplying part 132 that supplies air as an oxidizing agent used for selectively oxidizing CO in the CO removing device 131 is provided between the converting device 121 and the CO removing device 131.

In the hydrogen generating apparatus 100 having the aforementioned constitution, for example, upon stopping the heating device 112 at the time $T_0$ in FIGS. 3 to 5, only supply of the raw material from the fuel supplying part 18 is stopped, but supply of air from the air supplying part 17 is continued. Control is so performed that the raw material supplying device 101 and the water supplying device 103 are stopped simultaneously with the stop of the supply of the fuel, and the cooling fan 122 is driven.

The reforming device 111 is cooled and the converting device 121 is also cooled by passing air supplied from the air supplying part 17 through the combustion space 12 and the first annular space 13, and the converting device 121 is further cooled with air supplied from the cooling fan 122 to the cooling air flow path 22.

The period of time for cooling the catalysts can be shortened by this constitution, and thus the shutdown time and the shutdown energy can be decreased. In the case where cooling of the converting catalyst has priority, the operation of the air supplying part 17 may be stopped simultaneously with the stop of the cooling fan 122 described with reference to FIGS. 3 to 5.

The supply of the raw material and water is stopped in the shutdown operation, but only the supply of the raw material may be stopped to purge with steam. In this case, at the time when the reformation catalyst reaches 400° C. and the converting catalyst reaches 100° C., the supply of water is stopped, and the supply of raw material is started.

In the embodiment, such a cooling step is exemplified that the cooling operation is accelerated with the cooling fan 122 in the shutdown operation of the hydrogen generating apparatus, but it is possible that the converting catalyst is cooled by spontaneous cooling without any special cooling unit like those described the above, and the supply of the raw material is started with the raw material supplying device 101 in the case where the detected temperature of the first temperature detector 123 becomes the first threshold value or lower.

In the case where the converting catalyst is cooled without the cooling fan 122, the cooling air flow path 22 and the flow outlet 23 provided, such control may be performed that the converting catalyst is cooled indirectly by only stopping the supply of the fuel from the fuel supplying part 18 and continuing the supply of air from the air supplying part 17 in the shutdown operation as described above in the hydrogen generating apparatus 100 shown in FIG. 6. The air supplying part 17 in this case corresponds to an example of the air supplying part that also functions as the cooling device of the present disclosure. In this constitution, the cooling fan 122 is not necessarily provided, thereby reducing the cost. The operation of the air supplying part 17 may be controlled as similar to the cooling fan 122 shown in FIGS. 3 to 5.

The converting catalyst may be cooled by spontaneous cooling without acceleration of cooling with the combustion fan provided in the heating device 112. In this case, the control may be performed as shown in FIGS. 3 to 5 based on the times when the reformation catalyst and the converting catalyst reach the threshold values, respectively.

In FIG. 6, the reforming device 111, the converting device 121 and the CO removing device 131 are disposed in one vessel, but they may be disposed independently in separate vessels, and in this case, air aspirated with the fan provided in the heating device 121 is supplied to the converting device 121, whereby the air supplying part 17 can function as the cooling fan 122.

In the embodiment, the supplying amount of the raw material is set to such a flow amount that can sufficiently purge the hydrogen-containing gas accumulated in the hydrogen generating apparatus 100 for purging the interior of the hydrogen generating apparatus 100 with the raw material, and for example, the raw material is supplied at a flow rate of 1 NL/min for 10 minutes. The shutdown operation is completed after stopping the supply of the raw material, and the operation standby state occurs. The time when the shutdown operation is completed corresponds to the time $T_2$ in FIGS. 3 and 4 and the time $T_4$ in FIG. 5.

The process of supplying the raw material is an example of the purging process of the present disclosure, and the similar advantages as above can be obtained in such a manner that the supply of the raw material is started in the case where the detected temperature of the first temperature detector 123 is the first threshold value or lower in the hydrogen generating apparatus that is so constituted that the hydrogen-containing gas accumulated at least in the converting device 121 is purged with the raw material in the shutdown operation.

Figure 7:
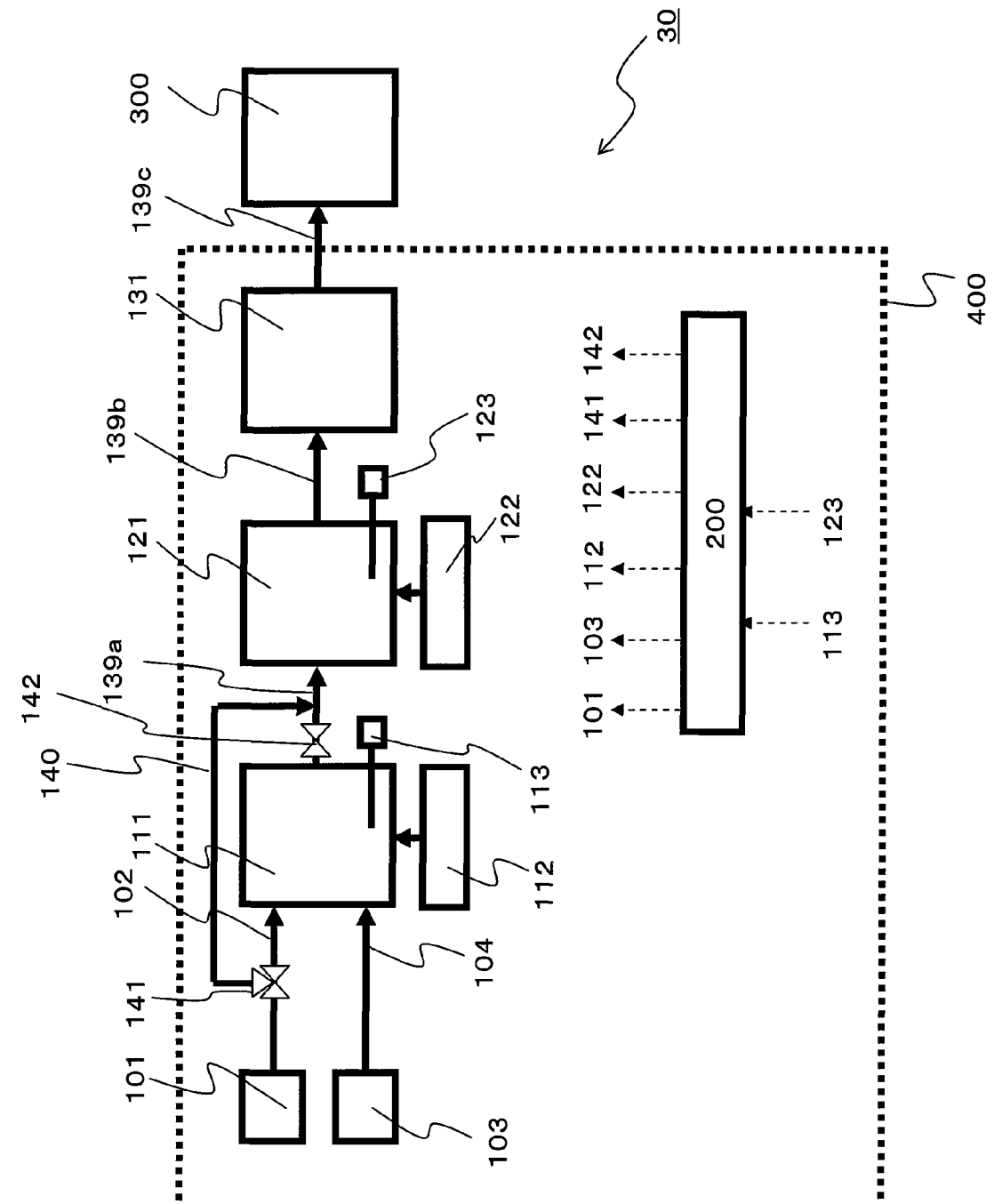
FIG. 7 is a schematic illustration showing a constitution of a fuel cell system in a modified example of an embodiment of the present disclosure.

The hydrogen generating apparatus that is so constituted that the hydrogen-containing gas accumulated at least in the converting device 121 is purged with the raw material will be described below. FIG. 7 is a constitutional view showing a fuel cell system 30 using such a hydrogen generating apparatus 400. The fuel cell system 30 shown in FIG. 7 is different from the fuel cell system 10 in FIG. 1 in such a point that a raw material supplying bypass path 140 is provided to connect between the hydrogen-containing gas path 139a and the raw material supplying path 102 with the reforming device 111 bypassed. A three-way valve 141 provided on the raw material supplying path 102 at the branching point to the raw material supplying bypass path 140, and a shutoff valve 142 is provided on the hydrogen-containing gas path 139a on the upstream side of the merging point with the raw material supplying bypass path 140. During electric power generation, the three-way valve 141 is so controlled that the side of the raw material supplying bypass path 140 is closed, and the side of the reforming device 111 is opened, thereby preventing the raw material gas from being supplied directly to the converting device 121.

In the fuel cell system 30, irrespective of the temperature state of the reformation catalyst, only the converting device 121 can be purged with the raw material without the reforming device 111 in the case where the temperature of the converting catalyst becomes the first threshold value or lower in the shutdown operation.

For example, as shown in FIG. 4, at the time $T_5$ when the temperature of the converting catalyst becomes the first threshold value or lower before lapsing the period of time $t_k$ until the temperature of the reformation catalyst becomes the second threshold value or lower, the raw material supplying device 101 is driven in the state where the cooling fan 122 is stopped, the three-way valve 141 is switched to the raw material supplying bypass path 140 side, and the shutoff valve 142 is closed, whereby only the interior of the converting device 121 can be purged with the raw material without raw material purge of the reforming device 111 performed.

Accordingly, there is no necessity of allowing the converting device 121 to stand until the time $T_1$ when the temperature of the reformation catalyst becomes the second threshold value or lower shown in FIG. 4, and thus occurrence of condensation of steam due to spontaneous cooling in the converting device 121 after stopping the cooling fan 122 can be suppressed. It is more preferred that at the time when the temperature of the reformation catalyst becomes the second threshold value or lower, the three-way valve 141 is switched to the reforming device 111 side, and the shutoff valve 142 is opened to purge the interior of the reforming device 111.

The reforming device 111, the converting device 121 and the CO removing device 131 in the fuel cell system 30 shown in FIG. 7 may be provided in one vessel, or may be disposed independently in separate vessels.

As described above, in the hydrogen generating apparatus and the fuel cell system having the same of the embodiment, the converting catalyst is cooled in the shutdown operation, and the purging operation with the raw material is performed when the converting catalyst becomes the first threshold value or lower where deterioration of the converting catalyst is suppressed, whereby the raw material can be prevented from being passed through the converting catalyst that is in a high temperature state, and therefore, deterioration of the catalyst capability of the converting catalyst can be suppressed. Accordingly, CO in the hydrogen-containing gas can be stably decreased even when the hydrogen generating apparatus is repeatedly started and stopped.

INDUSTRIAL APPLICABILITY

The hydrogen generating apparatus, the method for operating a hydrogen generating apparatus and the fuel cell system of the present disclosure have advantages such as, but not limited to, that in the raw material purge in the shutdown operation, deterioration in capability of the converting catalyst can be suppressed, and are useful as a hydrogen generating apparatus, a method for operating a hydrogen generating apparatus and a fuel cell system.

The invention claimed is:

1. A method for operating a hydrogen generating apparatus, comprising steps of:
    generating a hydrogen-containing gas from a raw material and water through reformation reaction in a reforming device provided with a reformation catalyst;
    decreasing carbon monoxide in the hydrogen-containing gas through shift reaction in a converting device provided with a converting catalyst;
    stopping an operation for heating the reforming device at a time of shutdown;
    cooling the converting catalyst by using a cooling device, after stopping the operation for heating, such that a temperature of the converting catalyst becomes a first threshold value or lower at a same time or before a temperature of the reformation catalyst becomes a second threshold value or lower, wherein deterioration of the converting catalyst by the raw material is suppressed when the temperature of the converting catalyst is equal to or lower than the first threshold value, and deterioration of the reformation catalyst by the raw material is suppressed when the temperature of the reformation catalyst is equal to or lower than the second threshold value;
    judging that the temperature of the converting catalyst becomes the first threshold value; and
    when it is judged that the temperature of the converting catalyst is the first threshold value or lower at the time of shutdown, starting purging an interior of the converting device with the raw material.

2. The method for operating the hydrogen generating apparatus according to claim 1, wherein the interior of the converting device is purged with the raw material when the temperature of the converting catalyst is the first threshold value or lower and is higher than a dew point of a gas in the converting device.

3. The method for operating the hydrogen generating apparatus according to claim 1, wherein the converting catalyst includes a Cu—Zn catalyst.

4. The method for operating the hydrogen generating apparatus according to claim 3, wherein the first threshold value is 200° C. or lower.

5. The method for operating the hydrogen generating apparatus according to claim 3, wherein the first threshold value is 100° C. or lower.

6. The method for operating the hydrogen generating apparatus according to claim 1, further comprising:
    further decreasing carbon monoxide in hydrogen-containing gas supplied from the converting device through selective oxidation reaction in a CO removing device with a selective oxidation catalyst.

* * * * *